United States Patent [19]

Lemmon, Jr. et al.

[11] 4,218,231

[45] Aug. 19, 1980

[54] COOLING OF EDGE STRETCHING ROLLERS FOR USE IN MAKING FLAT GLASS

[75] Inventors: Robert G. Lemmon, Jr., Houston; Melvin F. Earnest, Wichita Falls, both of Tex.

[73] Assignee: PPG Industries, Inc., Pittsburgh, Pa.

[21] Appl. No.: 12,672

[22] Filed: Feb. 15, 1979

[51] Int. Cl.² .................................................. C03B 18/02
[52] U.S. Cl. ................................. 65/99 A; 65/182 R; 65/200; 65/356
[58] Field of Search ............ 65/99 A, 356, 199, 182 R, 65/200

[56] References Cited

U.S. PATENT DOCUMENTS

| | | | |
|---|---|---|---|
| 3,353,943 | 11/1967 | Loutte | 65/182 R |
| 3,709,673 | 1/1973 | Bishop | 65/182 R |
| 3,860,406 | 1/1975 | Basler et al. | 65/99 A |
| 3,929,444 | 12/1975 | May et al. | 65/182 R |

Primary Examiner—Arthur D. Kellogg
Attorney, Agent, or Firm—Dennis G. Millman; Paul A. Leipold

[57] ABSTRACT

An edge roll machine for contacting a marginal portion of a body of glass being formed into a continuous sheet of glass while floating on molten metal is provided with a glass-engaging edge roll having an internal fluid coolant distributor having spiral vanes to direct the coolant against the surface the periphery of the roll in order to provide gripping contact with molten glass while avoiding sticking of the roll to the glass.

10 Claims, 4 Drawing Figures

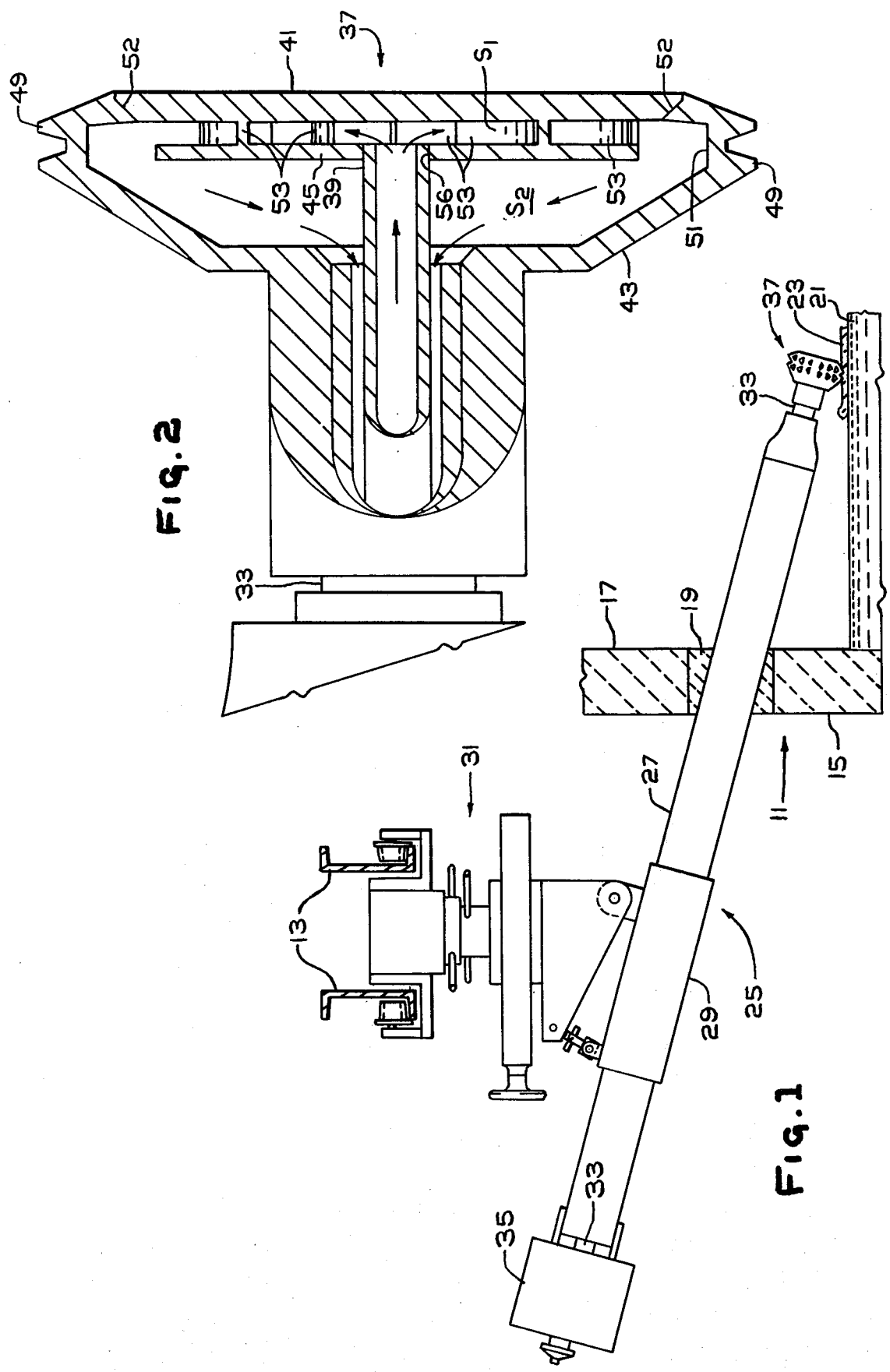

COOLING OF EDGE STRETCHING ROLLERS FOR USE IN MAKING FLAT GLASS

BACKGROUND OF THE INVENTION

1. Field of the Invention:

This invention relates to apparatus for applying forces to glass being formed into a continuous sheet of glass while floating on molten metal. This invention is particularly related to glass-engaging rolls employed in the manufacture of flat glass which is thinner than equilibrium glass.

2. Description of the Prior Art:

The following United States patents describe devices and methods of applying forces to glass while the glass is floating on molten metal in order to form continuous sheets of glass that are thinner than the thickness of glass produced when glass is permitted to float on molten metal, such as tin, to an equilibrium thickness.

U.S. Pat. No. 3,083,551 to Pilkington describes the general use of top edge rolls to maintain the width of an advancing body of glass that is undergoing stretching or attenuation forces to produce a continuous ribbon or sheet of glass of desired thickness.

U.S. Pat. No. 3,248,197 to Michalik et al discloses the general use of edge rolls shown as knurled rolls for engaging the marginal edge portion of an advancing body of glass to maintain the width of the glass during its stretching or attenuation toward a desired final thickness.

U.S. Pat. No. 3,353,943 to Loutte illustrates a glass edge-engaging wheel having internal means, including an internal baffle, for maintaining the temperature of such rolls during use in a glass manufacturing operation. The device described by Loutte is a device which engages the glass along its face, rather than about its periphery, although embodiments are described which include a cylindrical projection which does engage the top surface of a body of glass along the periphery of the cylindrical projection.

U.S. Pat. No. 3,709,673 to Bishop describes a fluid-cooled barrel for an edge roll machine along with a fluid-cooled shaft for connection to a hollow edge roll which receives coolant through the shaft during operation.

U.S. Pat. No. 3,929,444 to May et al describes a carriage-mounted edge roll assembly including, in a preferred embodiment as a subcombination, the water-cooled barrel and shaft assembly of Bishop.

The glass-engaging edge rolls described in the above-mentioned patents have been found to be useful for engaging the upper surface of a body of glass floating on molten metal, such as tin, in a glass forming chamber and have been effectively used to provide both tractive and stretching forces to glass to form glass into continuous sheets of desired thickness. Occasionally, problems have been encountered wherein molten glass sticks to an edge roll and consequently is drawn to one side of a forming chamber creating operational difficulties. The sticking occurs when a portion of the edge roller is not cool enough. When the metal of the roll is hot, then glass will stick to the roll. A portion of the roll edge may become hot because of sediment deposits or uneven coolant flow. Increased tonnage of glass production have made the problems of maintaining cool rolls more difficult. There remains a need for an improved edge roll intended to minimize the possibility of glass sticking to the edge roll while permitting the edge roll to be fabricated from conventional materials, such as stainless steel, rather than resorting to materials which are not wet by glass but which are subject to substantial wear when used as glass-contacting materials.

SUMMARY OF THE INVENTION

It is an object of this invention to overcome difficulties of the prior art apparatus and processes.

It is an object of this invention to provide better cooling of edge control rolls for float glass formation.

It is an object of this invention to prevent glass sticking to edge control rolls.

It is a further object to provide longer life edge control rolls.

It is an additional object to prevent sediment built-up in edge control rolls caused by uneven flow of coolant in the rolls.

It is another further object to prevent hot spots on edge control rolls.

These and other objects of the invention are generally accomplished by providing vanes on the surface of a distributor plate in an edge control device. These vanes direct the coolant fluid to establish an area of uniform tangential flow impinging on inner surface of the peripheral area of the roll where maximum cooling is desired.

In a preferred embodiment of the invention, the vanes on the distributor plate comprise six arcuate tabs arranged in a generally spiral configuration and conducting coolant in curving channels between the hot face of the roll and the distributor plate until the coolant is directed tangentially against the inner surface of the peripheral portion of the roll.

BRIEF DESCRIPTION OF THE DRAWINGS

FIG. 1 is an elevational view of a single glass edge roll apparatus according to this invention in conjunction with a portion of a glass forming chamber shown in partial transverse elevation; and FIG. 2 is a cross-sectional view of the edge roll employed as the glass-engaging member of the edge roll assembly shown in FIG. 1 illustrating, in detail, the features of the present invention.

DESCRIPTION OF THE PREFERRED EMBODIMENTS

Figure 3:
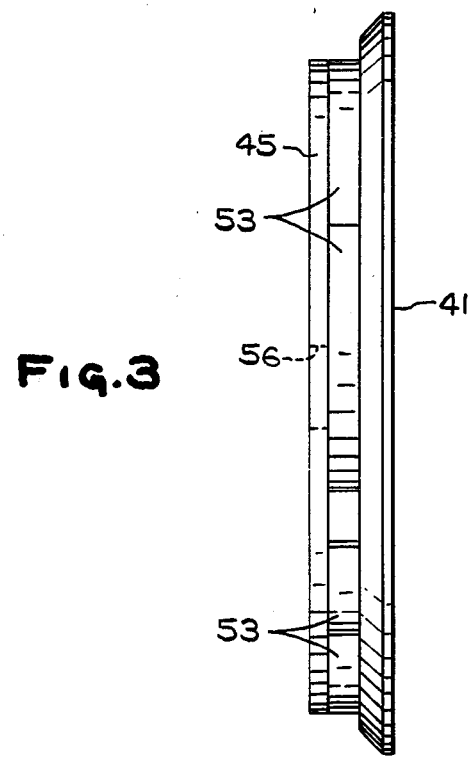
FIG. 3 is an end view of a distributor plate of the invention illustrating the arrangement of coolant directing vanes.

An apparatus is provided for making flat glass comprising a chamber containing a pool of molten metal, such as tin, upon which the glass is supported while being formed into a continuous sheet of glass. The apparatus includes devices for engaging marginal edge portions of the body of glass floating on the molten metal to prevent the glass from flowing to its equilibrium thickness. These devices may be used to maintain the thickness and width of the body of glass as desired by production needs. The thickness of the glass may be maintained at a thickness either greater or less than equilibrium thickness, although the invention is particularly beneficial for making glass much less than equilibrium thickness, such as glass having a thickness on the order of one-eighth inch (0.32 cm) or less.

The devices employed are edge roll assemblies. They are preferably provided with structural supporting means located outside the forming chamber, and they are provided with barrels which extend through side walls of the forming chamber and contain shafts to which glass-engaging edge rolls are connected. A typical structural supporting means includes a rail or rails mounted to each side of a forming chamber. Such rails may be located above openings through side walls of the forming chamber so that the edge roll assemblies may be supported upon and depend from the rails.

Each edge roll assembly includes a carriage mounted on a structural support with an edge roll barrel mounted on the carriage. The carriage, in combination with the edge roll barrel, provides for longitudinal, transverse and elevational movement of the barrel assembly. It also provides for axial movement of the barrel and angular movement of the barrel both in a horizontal plane and in a vertical plane. The barrel contains an edge roll shaft. Both the barrel and the shaft are elongated devices and they are preferably coaxially disposed with the shaft inside the barrel and free to rotate within it. The barrel and the shaft are individually provided with fluid coolant conduit space in order to direct coolant through each of them during operation. The preferred barrel and shaft design is that fully described in U.S. Pat. No. 3,709,673 to Bishop. The complete description of the tubular member or barrel of the device as shown in that patent is incorporated by reference herein.

The barrel is mounted on the carriage and is provided with means for rotating the shaft about its axis, such as a motor and gear assembly mounted on the barrel. The overall assembly, including the carriage, is preferably that described and claimed in U.S. Pat. No. 3,929,444 to May et al, which is incorporated by reference herein.

Mounted on the end of the shaft extending into the forming chamber is a glass-engaging member. The glass-engaging member is an edge roll, preferably a top edge roll. The top edge roll is hollow in order that it can receive fluid coolant from the shaft. The shaft preferably includes an internal coaxial tube so that fluid coolant may be directed into the hollow edge roll through that tube and carried away from the hollow edge roll through the annular space between the inside tube and the shaft. Alternatively, the flow of fluid coolant may be in the opposite direction, although this is not the preferred method of the instant invention.

The edge roll may be disc-like with either a smooth or a roughened peripheral surface or the edge roll may be cylindrical shape with a substantial cylinder height with a smooth or roughened surface. When a cylindrical edge roll is employed, a series of grooves may be provided in the surface of the edge roll, including a plurality of parralel grooves or several families of grooves which may be oriented to intersect one another. Edge rolls of either shape may be provided with a series of projections about the periphery of the edge roll. These projections may be sharp teeth as shown in U.S. Pat. No. 3,661,548 to Ito et al or U.S. Pat. No. 3,493,359 to Lawrenson or they may be blunt projections such as the projections common to knurled surfaces. Preferably, the projections are of limited height (e.g. blunt) in order to provide a limited wall thickness between the tips of the projections and the surface inside the roll for receiving fluid coolant described below.

Inside the edge roll there is provided an internal fluid coolant distributor plate connected to a face plate of the roll. The distributor plate separates the hollow interior of the roll into two spaces. One of the spaces is adjacent to a hot face of the roll, which is the face of the roll comprised of a face plate facing away from the shaft and toward the center of the forming chamber. The second space is adjacent a back face of the roll which comprises the face plate portion of the roll connected to the shaft and facing the barrel of the edge roll assembly which extends through a side wall of a forming chamber.

The distributor plate provides for peripheral communication between the two spaces which extends substantially about the interior periphery of the edge roll. In prior practice, a series of spacers at discrete locations were provided about the periphery of the distributor plate to hold it in position. These spacers interrupt the flow of fluid coolant at discrete locations, causing some disturbance and uneven flow of coolant as it passes from one space to the other.

During operation, a plurality of edge roll assemblies are employed to engage the marginal portions of a floating layer or body of molten glass advancing along the surface of molten metal in the forming chamber. The edge roll assemblies are employed as pairs with rolls engaging glass at matched locations on opposite sides of the forming chamber. The assemblies are preferably adjusted to provide for outward angular application of forces to the glass in order to maintain its width while attenuating or stretching it to a desired final thickness. All this is carried out while the glass is being progressively cooled and advanced along the surface of the pool of molten metal so that, upon release from the application of forces by a plurality of pairs of edge roll assemblies, the glass is dimensionally stable, having achieved a final desired width and thickness. According to a preferred embodiment of this invention, edge rolls are employed to maintain the width of an advancing layer of glass. The width is maintained substantially unchanged throughout the process while stretching the glass to a final desired thickness. Alternatively, the rolls may be employed to change the width of an advancing layer of glass as well as to change its thickness.

Referring now to FIGS. 1 and 2 there is shown a portion of a forming chamber 11 in which glass is formed into a continuous sheet or ribbon of flat glass. Extending along each side of the forming chamber 11 are rails 13 upon which an edge roll assembly may be mounted. The forming chamber 11 comprises, in part, a side wall (lower portion 15 and upper portion 17) with a side seal 19 provided at a location for receiving an edge roll assembly. Contained within the forming chamber 11 is a pool of molten metal 21 which is preferably molten tin or an alloy of tin. Floating on the surface of the molten metal 21 is a layer or body of glass 23.

An edge roll assembly 25 is provided for stretching the glass and for maintaining its width during stretching to a final desired thickness. The edge roll assembly 25 includes an edge roll barrel 27 mounted in and supported by a collar 29 which is mounted on a carriage 31 supported by the rails 13. The carriage assembly is fully described and claimed in U.S. Pat. No. 3,929,444 and is therefore not described in detail here.

Mounted in and extending through the edge roll barrel 27 is an edge roll shaft 33. Connected to the shaft 33 is a motor-gear box combination 35 mounted on the outer portion of the barrel. The motor-gear box combination 35 provides for rotating the shaft 33 about its axis. At the opposite end of the shaft 33 there is mounted an edge roll 37. The shaft 33 is provided with an inner conduit 39. This provides for supplying fluid coolant that can flow through the inner conduit 39 and also through the annular space between the inner conduit 39 and the shaft 33. The flow of coolant may be in either direction. It is preferred to provide for the flow of coolant into the edge roll 37 through the inner conduit 39 of the shaft with return flow being through the annular space.

The edge roll 37 includes an outer face plate 41 and an inner face plate 43. In the embodiment shown, the inner face plate 43 and the outer face plate 41 are joined together at weld 52 near their common periphery to form a disc-like edge roll. Alternatively, a cylindrical surface could be formed providing a further element separating the outer face plate 41 from the inner face plate 43, providing a cylindrically-shaped edge roll. Mounted inside the edge roll is a distributor plate 45. It is connected to the outer face plate 41 by the spiral deflectors 53 that are welded or otherwise held to outer face plate 41. Glass-engaging projections 49 are provided about the outer periphery of the edge roll 37. The glass-engaging projections 49 may be sharp teeth or blunt knurl, as previously described.

Located inside the edge roll 37 is the inner peripheral surface 51 which extends about the inside periphery of the edge roll 37. It is important to provide adequate cooling to inner surface 51. The surface 51 is cooled by coolant leaving the space $S_1$ between the distributor plate 45 and the hot face plate 41 of the edge roll. The coolant then enters space $S_2$ between the distributor plate 45 and the back face plate 43 of the edge roll prior to exiting from edge roll 37.

During operation, fluid coolant, such as water, is directed through the edge roll 37. The flow of fluid coolant is illustrated by the arrows in FIG. 2. Fluid coolant flows toward the edge roll 37 through the inner conduit 39 of the shaft 33. It is directed radially outwardly along the hot face plate 41 of the edge roll 37 and directly onto the peripheral surface 51 extending about the inside periphery of the edge roll. This flow serves to provide high heat transfer from the surface 51 of the edge roll adjacent the glass-engaging projections 49 so that heat is continuously and effectively removed from the glass-engaging projections 49 preventing molten glass from sticking tenaciously to them. The fluid coolant then, continues to flow inwardly through the second space $S_2$ and from there into and along the annular space between the inner conduit 39 and the shaft 33 and through it to a sink for coolant.

Figure 4:
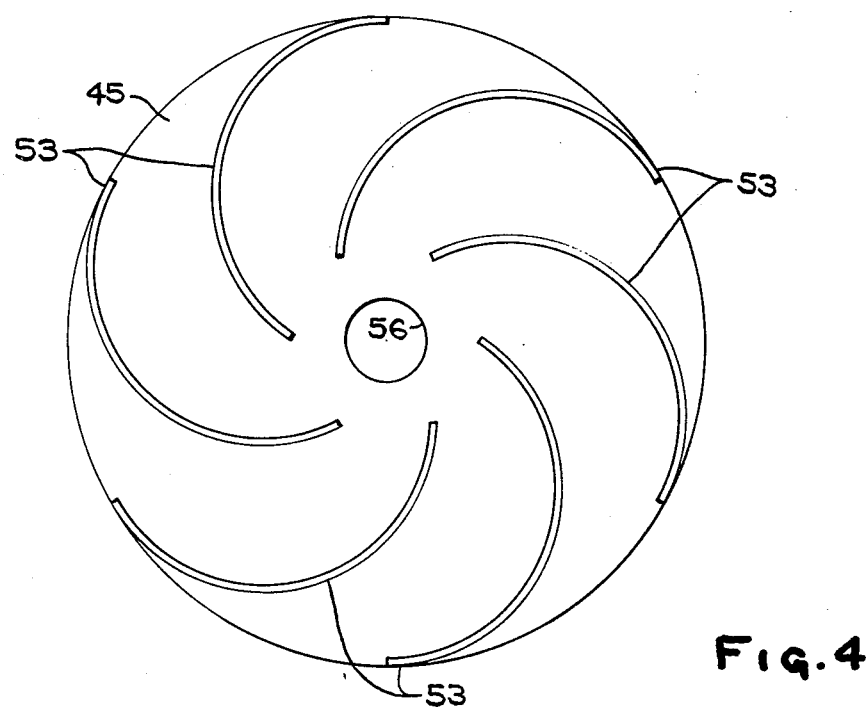
FIG. 4 is a side view of the distributor plate with vanes fastened to the hot face plate for the roll of the invention.

As illustrated in FIGS. 3 and 4, the distributor plate 45 comprises a generally circular plate having an arrangement of six arcuate vanes 53, generally in a pin wheel or spiral arrangement around coolant entry hole 56. The vanes and plate are preferably formed of stainless steel. As seen in FIG. 4, when the distributor plate 45 is attached or otherwise held to the outer or hot face of plate 41, the coolant is effectively channeled between plates 41 and 45 by the radially extending spiral vanes 53.

Although illustrated with six vanes in a spiral, it is within the invention to utilize any arrangement of vanes that directs the water or other coolant in a tangentially impinging path onto the inner surface 51 beneath teeth 49 where maximum cooling is needed. The uniformly directed circumferential flow against the surface 51, in addition to providing increased uniform cooling, also acts to prevent eddys or other regions of poor or lower speed coolant flow where sediment or deposition could occur. Hot spots are also prevented by even cooling. Prior distributor plates connected by tabs at the outer edge of the distributor plate to the outer face plate caused uneven flow with hot spots and deposition from the coolant as the flow along the inner peripheral surface was not even.

A greater number of fewer vanes 53 could be utilized in some instances. Further the arc and length of the vanes could be varied in order to meet different cooling requirements. Any arrangement of vanes providing tangentially directed coolant flow along peripheral surface 51 is suitable. Additionally, the spacing of the distributor plate 45 from the hot face 41 could be varied if desired. It is also within the invention to provide coolant directing vanes on the back of the distributor plate 41 if the direction of coolant flow was reversed from that illustrated in FIG. 2.

In accordance with the present invention, edge rolls are effectively cooled so that the edge roll may be employed to bite deeply into molten glass even at temperatures about 1500° to 1800° F. (815° to 870° C.). This permits the effective use of edge rolls to do substantial work to maintain the width and advance of glass while stretching it and providing for only the localized cooling of each edge roll rather than depending upon doing the most substantial work upon the glass after it has been generally cooled. As a result, it appears to be possible to stretch glass effectively during its passage through the generally hotter, upstream portions of a glass forming chamber and to consequently minimize the optical distortion effected when attempting to stretch glass when it has been more generally cooled following passage farther along through a glass forming chamber.

While this invention has been described with respect to particularly preferred embodiments, those skilled in the art will recognize that the present apparatus may be modified and equivalent elements may be substituted in the combination without departing from the spirit of this invention.

What is claimed is:

1. In an edge roll for engaging a surface of glass as the glass is advanced along the surface of molten metal to form it into a continuous, dimensionally stable sheet of flat glass wherein the roll is hollow and is mounted on a shaft which provides for its rotation and for axial, angular and longitudinal movement of the roll and provides a conduit for feeding a fluid coolant medium through the hollow interior of the roll and wherein the roll is provided with a plurality of projections about its periphery for engaging glass, the improvement which comprises an internal fluid coolant distributor plate connected to a face plate of the roll separating the hollow interior of the roll into two spaces, a first one adjacent a hot face of the roll and a second one adjacent a back face of the roll joined to the shaft with communication provided between the two spaces in a region extending substantially about the interior periphery of said roll; and wherein said distributor plate is provided with a plurality of curved vanes adapted to direct said fluid coolant radially toward the interior of the peripheral surface of said roll.

2. The roll of claim 1 wherein said curved vanes form a generally spiral configuration.

3. The roll of claim 1 or 2 wherein said vanes extend between said distributor plate and said face plate creating channels for said coolant.

4. The roll of claim 1 wherein said vanes are located on the side of said distributor plate toward said hot face.

5. The roll of claim 1 wherein said distributor plate and vanes comprise stainless steel.

6. The roll of claim 4 wherein said second space is larger than said first space.

7. A method of cooling an edge roll adapted to engage a surface of glass comprising directing coolant fluid against a central portion of the hot face of said roll and then radially outward along said hot face in a plurality of radially extending separate arcuate paths having an arcuate component that releases said coolant tangentially against the inner surface of the periphery of said roll.

8. The method of claim 7 wherein said coolant after contacting said periphery enters an exit space in the back of the roll and then exits from said roll.

9. The method of claim 7 wherein said arcuate paths form a sprial as they radiate from said central portion.

10. The method of claim 8 wherein said arcuate paths are bounded by arcuate vanes, a distributor plate and the hot face of said roller and said exit space is bounded by the back of said distributor plate and the back surface of said roll.

* * * * *